United States Patent Office 3,547,969
Patented Dec. 15, 1970

3,547,969
CATALYTIC HYDROGENATION OF OXIDIZED ALUMINUM TRIALKYLS
Kaye L. Motz, Ponca City, Okla., assignor to Continental Oil Company, Ponca City, Okla., a corporation of Delaware
No Drawing. Filed Feb. 5, 1968, Ser. No. 702,826
Int. Cl. C07f 5/06; C07c 31/02, 31/32
U.S. Cl. 260—448                                8 Claims

ABSTRACT OF THE DISCLOSURE

It is disclosed that catalytic hydrogenation of aluminum trialkoxides can be promoted by small amounts of $C_2$ to $C_4$ normal alcohols, $C_3$–$C_4$ isoalcohols and $C_4$ to $C_8$ secondary alcohols. The alcohols recovered by acid hydrolysis of these trialkoxides contain less impurities than alcohols recovered without hydrogenation.

---

For a number of years now, the high molecular weight aliphatic alcohols, e.g., $C_6$ to $C_{30}$ or even higher alcohols, have been growing in commercial importance. For example, the esters of such alcohols are useful as plasticizers in vinyl resins. Such alcohols are useful as intermediates in the production of biodegradable detergents. The alcohols themselves have been used as plasticizers in vinyl resins, as antistatic agents and foam depressants.

In recent years an important source of such alcohols has been from aluminum alkyls. For example, if one starts with a low molecular weight aluminum trialkyl or aluminum dialkyl hydride and reacts this material under suitable conditions with a low molecular weight olefin, preferably ethylene, one obtains an aluminum trialkyl of high molecular weight. Typically, aluminum triethyl is reacted with ethylene to form aluminum trialkyls with a random distribution of alkyl lengths. By controlling the reaction conditions, one obtains alkyl chains predominantly within a desired range, e.g., $C_{10}$ to $C_{16}$ with a small amount of lower and higher chain lengths present. If one starts with aluminum triethyl and reacts, or grows, this material with ethylene, one obtains alkyl chains with an even number of carbon atoms. On the other hand, if one starts with aluminum tripropyl and again uses ethylene as the olefin, then the alkyl chains will have an odd number of carbon atoms. It is also known that such aluminum alkyls can be converted to alcohols by oxidizing the aluminum alkyl to the alkoxide and recovering the alcohols by hydrolysis. The reactions can be represented simply as follows:

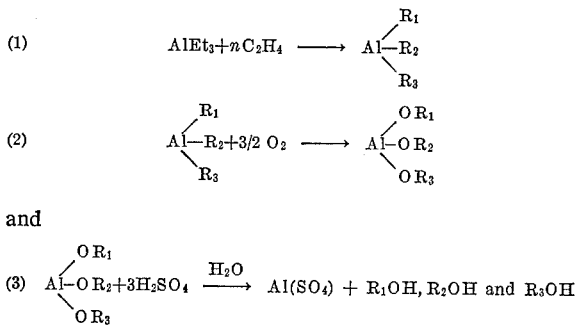

wherein $AlEt_3$ is aluminum triethyl, $n$ is an integer, $R_1$, $R_2$ and $R_3$ are alkyls, and wherein the sum of the carbon atoms in $R_1+R_2+R_3$ is equal to $n+6$.

Now, all of this is well known in the art and such alcohols are referred to as Ziegler chemistry alcohols, aluminum chemistry alcohols, growth products alcohols, and the like.

In the course of the oxidation of aluminum alkyls a product is formed which upon acid hydrolysis immediately after the completion of the oxidation gives carbonyls, such as aldehydes and dimer hydroxyaldehyde. Higher temperature reduces the oxidation reaction time but adversely affects yields due to the formation of these impurities. If the oxidized aluminum alkyl is allowed to stand for some time before hydrolysis, the product observed is largely dimer hydroxyaldehyde. If the oxidized aluminum alkyl is heated prior to hydrolysis such as by stripping, the observed product is the unsaturated dimer alcohol. These reactions are responsible for significant yield loss in commercial operations.

In my copending application filed on even date herewith under Ser. No. 702,800, I have disclosed and claimed that hydrogenation of aluminum trialkoxides prior to recovery of the alcohols by acid hydrolysis gives higher yields of improved quality of the desired normal alcohols. In that application, however, I found that many of the known hydrogenation catalysts were of little or no value in promoting hydrogenation. I have now found that any of the art recognized hydrogenation catalysts can be utilized if a small amount of certain alcohols is added as a promoter to the hydrogenation reaction zone.

According to this invention an aluminum trialkoxide is hydrogenated in the presence of a hydrogenation catalyst and a promoter selected from the group consisting of $C_2$ to $C_4$ normal alcohols, $C_3$ to $C_4$ isoalcohols, and $C_4$ to $C_8$ secondary alcohols.

As has been stated, the materials to be hydrogenated are the oxidized products of aluminum trialkyls. These alkyls may all be of the same chain length, such as the oxidized product of trihexylaluminum, tridodecylaluminum, trieicosyl aluminum, and the like, but will generally be the oxidized product of aluminum trialkyls having random alkyl chain lengths wherein the chains contain 6 to 30 carbon atoms or more. Generally, the alkyls will be predominately in the range of 6 to 18 carbon atoms.

The catalysts operable in the hydrogenation are any of the well known hydrogenation catalysts, such as copper, nickel, silver, vanadium, chromium, molybdenum, rhenium, platinum, ruthenium, rhodium, palladium, and the like as well as mixture and alloys of these metals. The starting material may be a reducible salt of these metals, such as copper chromite, copper oxide, and similar salts of silver and platinum and the like. That is, the reducible metal compounds would be the compounds falling below hydrogen in the electromotive series of metals. While it is generally preferred to pretreat the catalyst with hydrogen, this is especially desirable where a reducible compound is the starting material. The pure metal may be employed or the metal may be on a suitable support. A supported catalyst is particularly preferred in a continuous system, since much of the bulk required for filling the reaction zone can be supplied by the support. Any of the well known catalyst supports can be utilized, such as alumina, carbon, kieselguhr, zeolites, and the like. When the catalyst is supported, the ratio of catalyst to support will generally be in the range of 0.5/1 to .05/1.

As will be understood by those skilled in the art, hydrogenation conditions can vary over a wide range. In general, high pressures permit lower temperatures or residence time, or both. The amount of catalyst used will be that amount which promotes hydrogenation at reasonable rates under reasonable pressures and temperature conditions. The hydrogenation can be carried out either batchwise or continuously. For example, in a batch hydrogenation, as little as 0.1 weight percent catalyst would be operable if sufficient residence time is allowed under usual pressure and temperature conditions. On the other hand, there is no maximum amount of catalyst, however, for economic reasons one would use only that amount of catalyst required for optimum results. The usual range of catalyst used in a batch operation will vary from 1 to 5 weight percent based on the aluminum trialkoxide. Since high pressures facilitate hydrogenation and very high pressures require high cost equipment, the usual pressure range of 100 to 1000 p.s.i.g., and preferably 300 to 500 p.s.i.g. With these parameters set, then a temperature in the range of 100 to 250° C., preferably 130 to 200° C., can be satisfactorily employed for a residence time of 20 minutes to one hour. The same considerations must be given in a continuous operation, in which case the same general ranges of temperature, pressure, residence time, and catalyst are utilized. That is, the space velocity is controlled to obtain the optimum residence time. In both types of operation, a superatmospheric hydrogen pressure is maintained throughout the hydrogenation reaction. The hydrogenation is preferably carried out with the aluminum trialkoxide in a nonreactive solvent such as a liquid saturated hydrocarbon.

As stated above, only few catalysts work unless promoted with a small amount of alcohol. In general, 0.1 to 5 percent of the promoter alcohol, based on the aluminum trialkoxide, is used. While larger amounts of the promoter alcohol can be used, it is generally not required and little or no additional benefits are obtained. Suitable promoter alcohols are the $C_2$ to $C_4$ normal alcohols, such as ethanol, propanol, and butanol, $C_3$ and $C_4$ isoalcohols, e.g., isopropanol and isobutanol and $C_4$ to $C_8$ secondary alcohols such as secondary butanol, secondary hexanol and secondary octanol.

EXAMPLE I

Growth product (G.P.) or higher molecular weight oxidized aluminum trialkyls was subjected to hydrogenation utilizing rhodium on alumina as the catalyst (about 1% rhodium on alumina by weight based on aluminum trialkyl) in tetradecane as the solvent. The hydrogenation was carried out at various temperatures for 1 hour at 500 p.s.i. The alcohol was then recovered by sulfuric acid hydrolysis, and the $C_{18}$, $C_{20}$ and $C_{22}$ alcohols analyzed for non-primary alcohols and the percentages of such impurities tabulated. The results are given in Table 1.

ml. of recently oxidized growth product and heated to 150° C. for 1 hour under 500 p.s.i.g. hydrogen, the catalyst removed by filtration, and alcohol recovered by hydrolysis with sulfuric acid. The $C_{18}$ was analyzed for percent impurities, e.g., nonnormal monohydric alcohol. The results are shown in Table 2.

TABLE 2

| Run | Catalyst | Alcohol | Percent impurities |
|---|---|---|---|
| 1 | Control | None | 9.6 |
| 2 | Copper chromite | do | 3.87 |
| 3 | Barium promoted copper chromite | do | 3.35 |
| 4 | Copper chromite | 10% i-$C_3$OH | 3.1 |
| 5 | do | 1% i-$C_3$OH | 4.1 |
| 6 | Rh on $Al_2O_3$ | None | 9.95 |
| 7 | do | 10% i-$C_3$OH | 3.3 |
| 8 | do | 1% i-$C_3$OH | 5.3 |
| 9 | do | 10% $C_2H_5$OH | 4.9 |
| 10 | do | 1% $C_2H_5$OH | 7.2 |
| 11 | 0.5% Ru on $Al_2O_3$ | None | 8.6 |
| 12 | 5% Ru on $Al_2O_3$ | do | 7.0 |
| 13 | do | 5% i-$C_3$OH | 3.2 |
| 14 | Cobalt on kieselguhr | None | 5.9 |
| 15 | do | 5% i-$C_3$OH | 3.4 |
| 16 | Nickel | None | 3.45 |
| 17 | Nickel on kieselguhr | 5% i-$C_3$OH | 3.3 |
| 18 | Pd on $Al_2O_3$ | None | 9.7 |
| 19 | Pd on silica-alumina | 5% i-$C_3$OH | 3.5 |
| 20 | Pd+Cr on $Al_2O_3$ | None | 8.5 |
| 21 | do | 5% i-$C_3$OH | 3.6 |
| 22 | Ni, Moly, Co on $Al_2O_3$ | None | 9.2 |
| 23 | do | 5% i-$C_3$OH | 3.0 |
| 24 | Cr on $Al_2O_3$ | 5% i-$C_3$OH | 3.0 |
| 25 | Pd on $Al_2O_3$ | None | 9.7 |
| 26 | Pd on silica $Al_2O_3$ | do | 9.4 |
| 27 | Pd on $Al_2O_3$ | 5% i-$C_3$OH | 3.3 |

From the above data it can be seen that many of the hydrogenation catalysts which were ineffective without the alcohol promoter gave results comparable to or better than the copper chromite catalyst. Although the copper alcohol showed little or no advantage with the copper catalyst, the process was still operable.

Having described my invention, I claim:

1. The process for treating aluminum trialkoxides having at least 6 carbon atoms per alkoxide group and obtained by oxidation of aluminum trialkyls obtained by reacting a low molecular weight aluminum alkyl with a low molecular weight olefin comprising hydrogenating said aluminum trialkoxide at a pressure of at least 100 p.s.i.g. and a temperature in the range 100 to 250° C. in the presence of at least 0.1 weight percent of a hydrogenation catalyst and at least 0.1 weight percent of an alkanol

TABLE 1

| Run | Conditions (rhodium catalyst) | Temp., °C. | Time, hrs. | Percent impurities | | |
|---|---|---|---|---|---|---|
| | | | | $C_{18}$ | $C_{20}$ | $C_{22}$ |
| 1 | Freshly oxidized G.P. | 165 | 1 | 10.7 | 22.9 | 45 |
| 2 | G.P. 48 hrs. after oxidization | 165 | 1 | 6.8 | 14.3 | 26 |
| 3 | G.P. 72 hrs. after oxidization | 165 | 1 | 10.0 | 20.2 | 38.6 |
| 4 | 10% iso $C_3$OH—48 hrs. after oxidation | 165 | 1 | 3.3 | 5.9 | 10.4 |
| 5 | 1% iso $C_3$OH—48 hrs. after oxidation | 165 | 1 | 5.3 | 10.0 | 10.4 |
| 6 | 10% iso $C_3$OH—72 hrs. after oxidation | 145 | 1 | 2.7 | 6.8 | 12 |
| 7 | 1% iso $C_3$OH—72 hrs. after oxidation | 145 | 1 | 4.0 | 8.0 | 14 |

From Table 1 it can be seen that the isopropanol substantially improved the effect of the hydrogenation.

EXAMPLE II

A number of runs was made using various catalysts, both alcohol promoted and unpromoted, wherein 1 gram of catalyst in 5 ml. of tetradecane was then added to 80 selected from the group consisting of $C_2$ to $C_4$ normal alkanols, isobutanol and $C_3$ to $C_8$ secondary alkanols.

2. The process of claim 1 wherein the promoting alkanol is present in the range of 0.1 to 2 weight percent and the hydrogenation catalyst is present in the range of 1 to 5 weight percent.

3. The process of claim 2 wherein the hydrogenation catalyst is selected from the group consisting of rhodium on alumina, ruthenium on alumina, nickel on carbon, and platinum on carbon.

4. The process of claim 3 wherein the promoting alkanol is isopropanol.

5. The process of claim 1 wherein the hydrogenation is carried out at a pressure in the range of 300 to 500 p.s.i.g.

6. The process of claim 5 wherein the catalyst is on a support.

7. The process of claim 6 wherein the ratio of catalyst to support is in the range of 0.5/1 to .05/0.1.

8. The process of claim 7 wherein the catalyst support is alumina.

References Cited
UNITED STATES PATENTS

| | | | |
|---|---|---|---|
| 3,270,065 | 8/1966 | Austin | 260—643B |
| 3,394,195 | 7/1968 | Conley et al. | 260—638 |
| 3,450,735 | 6/1969 | Lundeen et al. | 260—448AO |

LEON ZITVER, Primary Examiner

J. E. EVANS, Assistant Examiner

U.S. Cl. X.R.

260—632